US006990272B2

(12) United States Patent
Lefebvre

(10) Patent No.: US 6,990,272 B2
(45) Date of Patent: Jan. 24, 2006

(54) APPARATUS FOR GENERATING AN OPTICAL INTERFERENCE PATTERN

(75) Inventor: Paul Lefebvre, Laval (CA)

(73) Assignee: LXSIX Photonics Inc., Quebec (CA)

( * ) Notice: Subject to any disclaimer, the term of this patent is extended or adjusted under 35 U.S.C. 154(b) by 273 days.

(21) Appl. No.: 10/296,079

(22) PCT Filed: Jul. 26, 2002

(86) PCT No.: PCT/CA02/01184

§ 371 (c)(1),
(2), (4) Date: Jan. 16, 2003

(87) PCT Pub. No.: WO03/010559

PCT Pub. Date: Feb. 6, 2003

(65) Prior Publication Data

US 2004/0042723 A1   Mar. 4, 2004

(30) Foreign Application Priority Data

Jul. 26, 2001  (CA) .................................. 2354321

(51) Int. Cl.
G02B 6/34   (2006.01)
(52) U.S. Cl. .......................................... 385/37; 385/39
(58) Field of Classification Search ................. 385/37, 385/39, 147

See application file for complete search history.

(56) References Cited

U.S. PATENT DOCUMENTS

| 4,093,338 A | 6/1978 | Bjorklund et al. |
| 4,105,332 A | 8/1978 | Hohne et al. |
| 4,725,110 A | 2/1988 | Glenn et al. |
| 4,807,950 A | 2/1989 | Meltz et al. |
| 5,016,951 A | 5/1991 | Deason et al. |
| 5,042,897 A | 8/1991 | Meltz et al. |
| 5,066,133 A | 11/1991 | Brienza |
| 5,218,651 A | 6/1993 | Faco et al. |
| 5,309,260 A | 5/1994 | Mizrahi et al. |
| 5,363,239 A | 11/1994 | Mizrahi et al. |
| 5,367,588 A | 11/1994 | Hill et al. |
| 5,377,288 A | 12/1994 | Kashyap et al. |
| 5,400,422 A | 3/1995 | Askins et al. |
| 5,625,472 A | 4/1997 | Mizrahi et al. |
| 5,636,304 A | 6/1997 | Mizrahi et al. |

(Continued)

FOREIGN PATENT DOCUMENTS

DE   36 26 715   2/1988

(Continued)

Primary Examiner—Frank G. Font
Assistant Examiner—Michael P. Mooney
(74) Attorney, Agent, or Firm—Merchant & Gould P.C.

(57) ABSTRACT

Apparatus for producing an interference pattern from an input optical beam, including a first optical element for separating the input optical beam into a plurality of divergent optical sub-beams and a second optical element including a first surface and a second surface. The first surface is optically coupled to the first optical element to receive at least two of the plurality of sub-beams. In addition, the second optical element is capable of redirecting via total internal reflection at least one of the sub-beams received at the first surface such that at least two sub-beams emerge from the second surface along respective paths intersecting one another outside the second optical element at a distance from the second surface. Advantageously, the use of total internal reflection in the second optical element for sub-beam redirection removes any requirement for a mirror to perform this function, results in only minimal power losses as the sub-beams reflect internally and the location at which they intersect is easily adjustable.

44 Claims, 2 Drawing Sheets

U.S. PATENT DOCUMENTS

| | | |
|---|---|---|
| 5,652,818 A | 7/1997 | Byron |
| 5,668,901 A | 9/1997 | Keck et al. |
| 5,712,715 A | 1/1998 | Erdogan et al. |
| 5,768,454 A | 6/1998 | Chesnoy et al. |
| 5,787,213 A | 7/1998 | Brownlow |
| 5,790,726 A | 8/1998 | Ito et al. |
| 5,818,988 A | 10/1998 | Modavis |
| 5,830,622 A | 11/1998 | Canning et al. |
| 5,956,442 A | 9/1999 | Byron |
| 5,996,375 A | 12/1999 | Nakai et al. |
| 6,041,069 A | 3/2000 | Kashyap et al. |
| 6,043,497 A | 3/2000 | Quetel et al. |
| 6,093,927 A | 7/2000 | Wickham |
| 6,130,973 A | 10/2000 | Lauzon et al. |
| 6,178,045 B1 | 1/2001 | Cook et al. |
| 6,836,592 B2 * | 12/2004 | Mead et al. ............... 385/37 |

FOREIGN PATENT DOCUMENTS

| | | |
|---|---|---|
| DE | 197 19 728 | 11/1998 |
| DE | 198 10 615 | 9/1999 |
| EP | 0 903 597 A2 | 3/1999 |
| JP | 6-35704 | 2/1994 |
| WO | WO 00/02068 | 1/2000 |
| WO | WO 00/29884 | 5/2000 |
| WO | WO 00/41018 | 7/2000 |

* cited by examiner

APPARATUS FOR GENERATING AN OPTICAL INTERFERENCE PATTERN

FIELD OF THE INVENTION

The invention relates to the generation of optical interference patterns, which can be of particular use in producing changes in the index of refraction of a glass medium such as the core of an optical fiber.

BACKGROUND OF THE INVENTION

Certain types of glass have optical properties that can be altered when they are exposed to radiation. In particular, some index of refraction variations can be permanently inscribed in these types of glass with ultraviolet radiation. In Bragg grating writing by flood exposure, an interference pattern is permanently written in the form of index of refraction variations in an optical fiber. Typically, a laser beam in the ultraviolet (UV) region of the optical spectrum is split into two sub-beams. The two sub-beams are then recombined to produce an interference pattern which is shone on the core of the optical fiber for a period of time. After the laser beam is turned off, the index of refraction variations stay inscribed in the optical fiber.

PCT Application 00/02068 filed on Jun. 30, 1999 by Bhatia et al. describes an apparatus to write Bragg gratings in an optical fiber. The apparatus includes a laser, which produces a laser beam. The laser beam is split into two sub-beams by a beam splitter. Then, the two sub-beams are each reflected by a plurality of mirrors to make them converge at a certain location in space. The two converging beams interfere and therefore produce an interference pattern at the certain location. The optical fiber is positioned at the certain location to write the grating.

Apparatuses such as the one described in the above-referenced PCT application present many disadvantages. First, the mirrors have to be precisely aligned to produce the desired interference pattern. Also, the whole apparatus has to be very rigid and isolated from external vibrations to keep the interference pattern at a precise location in space. If the interference pattern is displaced during the writing process, the grating will be veiled and may eventually be useless. In addition, the surface of the mirrors has to be kept clean in order to bring as much energy as possible to the certain location where the interference pattern is produced.

Two properties that are often required of Bragg gratings are apodization and balance. Apodization relates to having an interference pattern including a plurality of bright fringes and a plurality of dark fringes wherein the bright fringes are not uniformly bright across the whole interference pattern. Therefore, if an apodized interference pattern with fringes having a low intensity close to the extremities of the grating is used to produce the Bragg grating, the index of refraction differences will also be apodized, which is desirable in some Bragg gratings used as optical filters. Balance relates to having indices of refraction in the grating which vary alternatively above and below an average value. In the apparatus described above, only variations in indices of refraction in one direction are possible as dark fringes in the interference pattern produce no variation in the index of refraction inside the optical fiber and bright fringes all produce variations in the index of refraction inside the optical fiber having a same sign. Once again, it is often desirable to have variations above and below an average value when the gratings are used as optical filters.

To produce a balanced grating, two exposures are required in the apparatus described above. In a first exposure, the beams, eventually apodized, are used to create the variations in index of refraction as described above. In the second exposure, the sub-beams are slightly offset to provide a uniform increase in index of refraction along the grating. However, this two-step process is time consuming as two exposures have to be made. In addition, the apodization is performed through collimators and spatial filters which need to be precisely aligned with the rest of the apparatus.

In view of the above, there is a need in the industry to provide new apparatuses and method for writing features in or on a photosensitive medium.

More particularly, the invention relates to the use of an interference pattern between two coherent light beams to induce changes in the index of refraction of the medium wherein the two light beams are produced by splitting a first light beam and propagated in a prism through total internal reflection.

SUMMARY OF THE INVENTION

According to a first broad aspect, the present invention provides an apparatus for producing an interference pattern from an input optical beam. The apparatus includes a first optical element for separating the input optical beam into a plurality of divergent optical sub-beams and a second optical element including a first surface and a second surface. The first surface is optically coupled to the first optical element to receive at least two of the plurality of sub-beams. In addition, the second optical element is capable of redirecting via total internal reflection at least one of the sub-beams received at the first surface such that at least two sub-beams emerge from the second surface along respective paths intersecting one another outside the second optical element at a distance from the second surface.

Advantageously, the use of total internal reflection in the second optical element for sub-beam redirection removes any requirement for a mirror to perform this function. This improves not only physical robustness but also sensitivity to dust and grease. Moreover, there are only minimal power losses as the sub-beams reflect internally and the location at which they intersect is easily adjustable.

In addition, the present invention has the capability to pass zeroth and first order diffration sub-beams, which allows a balanced grating to be produced in a single exposure.

According to a second broad aspect, the present invention provides a method of writing an interference pattern on a photosensitive medium with a laser beam. The method includes receiving at least two of the sub-beams at an optical element; redirecting at least one of the received sub-beams via total internal reflection such that at least two sub-beams emerge from the optical element along respective paths that intersect in a region of intersection; and placing the photosensitive medium at least partly in the region of intersection.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
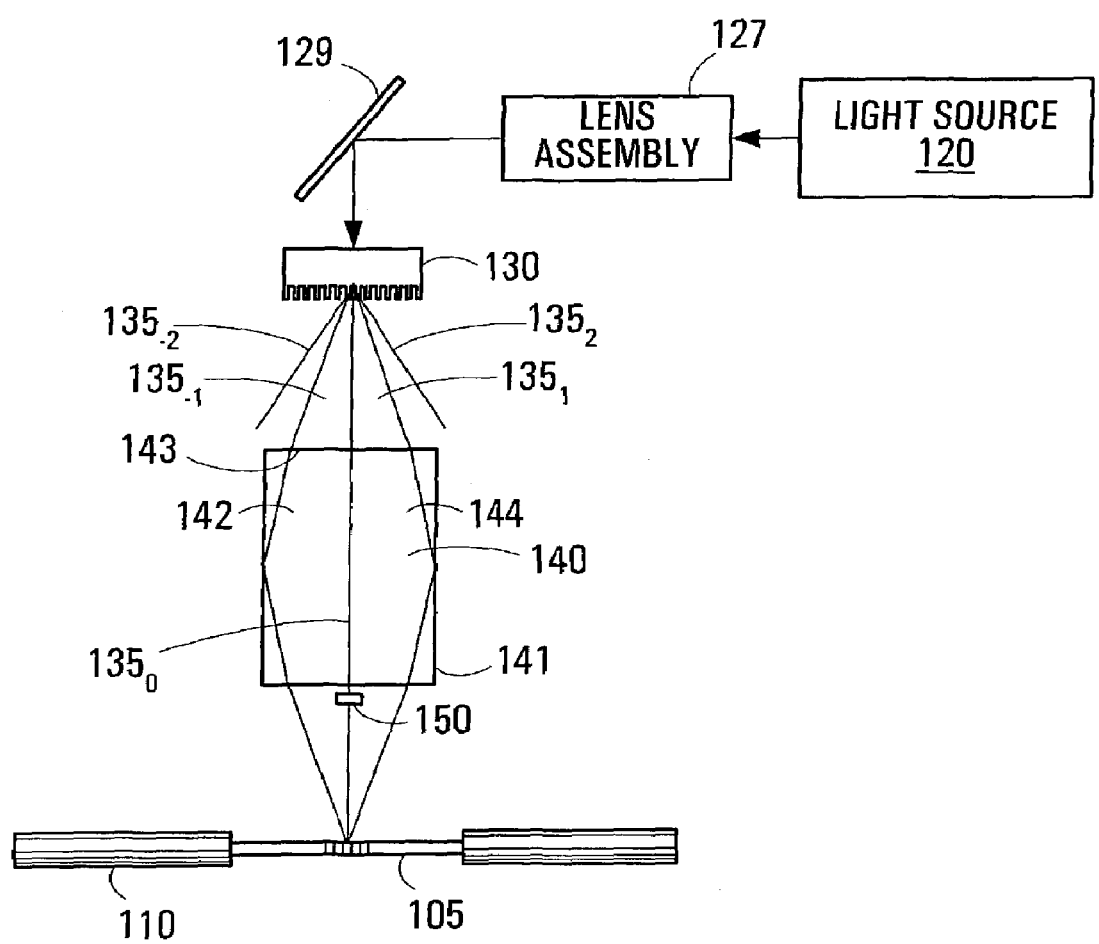
FIG. 1 shows an optical apparatus for producing an interference pattern on a photosensitive substrate in accordance with an embodiment of the present invention.

FIG. 1 shows an optical apparatus 100 for producing an interference pattern on a photosensitive medium in the form of a core 105 of an optical fiber 110. While the optical apparatus 100 is described herein in the context of Bragg grating writing in an optical fiber 110, the reader skilled in the art will readily appreciate that the apparatus could be used in other contexts without departing from the spirit of the invention. In specific examples of implementation, the apparatus could be used to produce an interference pattern illuminating other photosensitive media, including discrete optical fibers, optical fibers mounted in a module and integrated optics components.

The optical apparatus 100 includes a laser 120, a diffractive element 130 and a transmissive block 140 as described in further detail herein below. The laser 120 produces a coherent beam of light 125. In the case of Bragg grating writing in an optical fiber, the laser 120 may produce light at a wavelength between 193 nm and 300 nm and is either pulsed or continuous. In an even more specific case, the laser 120 produces light at a wavelength between 193 nm and 260 nm. However, it will be understood that a laser 120 producing a beam 125 having a wavelength outside of the mentioned interval can be used in the apparatus 100.

The beam 125 may be shaped and collimated by a lens assembly 127. The shaped and collimated beam is then deflected by a mirror 129, that can be used to optimally align the beam 125 with the core 105. The mirror 129 may be movable in order to permit precise alignment to be controlled by a user or a feedback control circuit. The reader skilled in the art will recognize that while the laser 120, the lens assembly 127 and the mirror 129 are preferably used in the optical apparatus 100, other sources of coherent light could be used without departing from the spirit of the invention, with or without the lens assembly 127. Also, the apparatus of the present invention may be used in cases where it is desirable to produce an interference pattern from non-coherent light. The beam 125 arrives at the diffractive element 130, which produces a diffraction pattern including a plurality of sub-beams $135_k$, k=0, ±1, ±2, ... Each pair of sub-beams $135_{\pm k}$ corresponds to a diffraction order k of a diffraction pattern produced by the diffractive element 130. The sub-beams $135_k$ diverge from each other, each at a respective divergence angle measured with respect to the sub-beam $135_0$. In a specific example of implementation, the diffractive element 130 can be an apodized holographic phase mask producing sub-beams $135_{-1}$ and $135_1$ diverging from the sub-beam $135_0$ at an angle between 7° and 23°. The exact number of sub-beams $135_k$ produced and the value of their respective divergence angle depend on the specific diffractive element used and on the wavelength of the beam 125 produced by the laser 120.

In a variant, the diffractive element 130 can be replaced by a beam splitter in the optical apparatus 100. However, a typical beam splitter does not produce an order 0 sub-beam $135_0$. As it will be detailed below, the order 0 sub-beam $135_0$ is preferably present to produce a balanced grating in a single exposure.

The transmissive block 140 is composed of a material having an index of refraction higher than its surroundings and which is transparent or nearly transparent at the wavelenth of the beam 125 produced by the laser 120. In a very specific example of implementation, the transmissive block 140 can be made of quartz. In a specific example of implementation, shown on FIG. 1, the transmissive block 140 is a cubic prism having homogenous optical properties and including two planar lateral faces 141 and 142, one planar front face 143 and one planar back face 144. In a very specific example of implementation, suitable dimensions of the cubic prism may be 3 cm×3 cm×15 cm located approximately 2 cm from the diffractive element 130 and approximately 2 cm from the core 105. However, the reader skilled in the art will appreciate that these dimensions can vary considerably, depending on the interference pattern to be produced.

In an embodiment of the present invention, the transmissive block 140 is adapted to propagate only the zeroth and first orders of diffraction produced by the diffractive element 130, namely, the sub-beams $135_{-1}$, $135_0$ and $135_1$. Sub-beams corresponding to other orders of diffraction can be avoided by suitably dimensioning and positioning the transmissive block 140 so that it is clear of the path taken by the sub-beams corresponding to these other orders of diffraction. In other embodiments of the invention, undesired orders of diffraction are filtered by the transmission block 140.

In one embodiment of the present invention, the two first order sub-beams $135_{\pm 1}$ are reflected inside the transmissive block 140 through total internal reflection and subsequently converge on the core 105 to produce an interference pattern. In other embodiments of the present invention, one of the first order sub-beams may pass straight through the transmissive block 140, while the other of the first order sub-beams may be totally internally reflected and redirected towards the sub-beam that was not totally internally reflected. Intersection of at least two sub-beams exiting a back surface of the transmissive block 140 occurs outside the transmissive block 140 at a distance away from its back surface.

In this specific example of implementation, the sub-beams $135_{-1}$, $135_0$ and $135_1$ enter the transmissive block 140 through the front face 143. Since the sub-beams $135_{-1}$ and $135_1$ are not perpendicular to the front face 143, they will be refracted when entering the transmissive block 140, in opposition to the sub-beam $135_0$ which enters the transmissive block 140 perpendicularly to the front face 143 and is therefore not refracted.

Inside the transmissive block 140, the sub-beam $135_0$ is propagated in a straight line to the back face 144. However, the dimensions of the transmissive block 140 are such that the two sub-beams $135_{-1}$ and $135_1$ arrive to the lateral faces 141 and 142 before arriving to the back face 144. Since the index of refraction inside the transmissive block 140 is larger than the index of refraction outside the transmissive block 140, the two sub-beams $135_{-1}$ and $135_1$ are reflected through total internal reflection at the lateral surfaces 141 and 142 of the transmissive block 140. Also, the transmissive block 140 has dimensions such that the two sub-beams $135_{-1}$ and $135_1$ will arrive to the back face 144 before intersecting.

When exiting the transmissive block 140 through the back face 144, the two sub-beams $135_{-1}$ and $135_1$ are refracted and converge at a certain location in space. Since the two sub-beams $135_{-1}$ and $135_1$ have been reflected inside a single rigid piece of material, there are only minimal losses in a power carried by the two sub-beams $135_{-1}$ and $135_{1}$ and the location at which they intersect is easily adjustable.

Meanwhile, the zeroth order sub-beam $135_0$ emerges from the transmissive block 140 without having been deflected and the zeroth order sub-beam may be focused by a focusing lens 150. The relative position of the focusing lens 150 with respect to the optical fiber 110 determines an intensity of the zeroth order beam $135_0$ illuminating the optical fiber 110, which allows to write a balanced grating on the optical fiber in a single exposure. The reader skilled in the art will readily appreciate that the focussing lens 150 alleviates the need for a specialized diffractive element that is capable of producing balanced order 1 and 0 sub-beams $135_{-1}$, $135_0$ and $135_1$.

The reader skilled in the art will readily appreciate that many shapes of the transmissive block 140 can be designed so as to select only orders 0 and 1 of diffraction and make two sub-beams of first order converge at the certain location in space through total internal reflection. In addition, transmissive blocks selecting other orders of diffraction can be used in the optical apparatus 100 without departing from the spirit of the invention.

In a variant, the front face 143 of the transmissive block 140 is partially coated with an opaque layer to block the sub-beam $135_0$. This may be desirable in processes wherein the sub-beam $135_0$ is not required.

It will be appreciated that since the transmissive block 140 is a self-contained unit for redirecting the sub-beams $135_k$, it can be readily exchanged with another transmissive block with only minimal realignment requirements, which affords flexibility in the use of the apparatus 100.

It will also be appreciated that the distance between the focusing lens 150 and the core 105 determines the intensity of the sub-beam $135_0$ at the location of the core 105. Alternatively, the focusing lens 150 could be interchanged with another lens having a different focal distance to vary intensity of the sub-beam $135_0$ at the location of the core 105. The reader skilled in the art will appreciate that the exact value of the distance between the focusing lens 150 and the core 105 and the exact value of the focal distance of the focusing lens 150 required to produce a balanced Bragg grating depend on many characteristics of the apparatus 100. Accordingly, it is preferable to adjust these parameters for each particular grating written, either through theoretical calculations or through measurements of intensity using an optical power meter. Such methods for adjusting these parameters are well known in the art and will not be discussed in further detail.

It will further be appreciated that in those instances when the sub-beam $135_0$ is undesired, the sub-beam $135_0$ can be blocked by replacing the focussing lens 150 by a piece of an opaque material.

Figure 2:
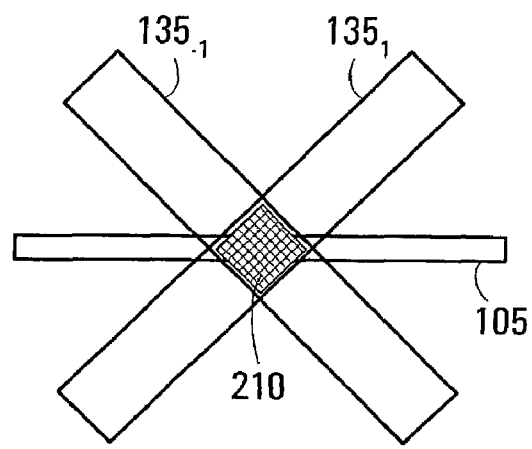
FIG. 2 shows a region of space wherein the interference pattern is produced by the optical apparatus shown in FIG. 1.

It will also be appreciated that the distance between the transmissive block 140 and the core 105 regulates a length of grating written in the optical fiber 110. As shown on FIG. 2, the interference pattern produced by the two sub-beams $135_{-1}$ and $135_1$ is present in a diamond-shaped region of space 210 in which the two sub-beams $135_{-1}$ and $135_1$ intersect. Depending on the exact position of the core 105 in the diamond-shaped region of space 210, the length of a portion of the core 105 exposed to the interference pattern will vary, which will therefore change the length of the grating produced.

Figure 3:
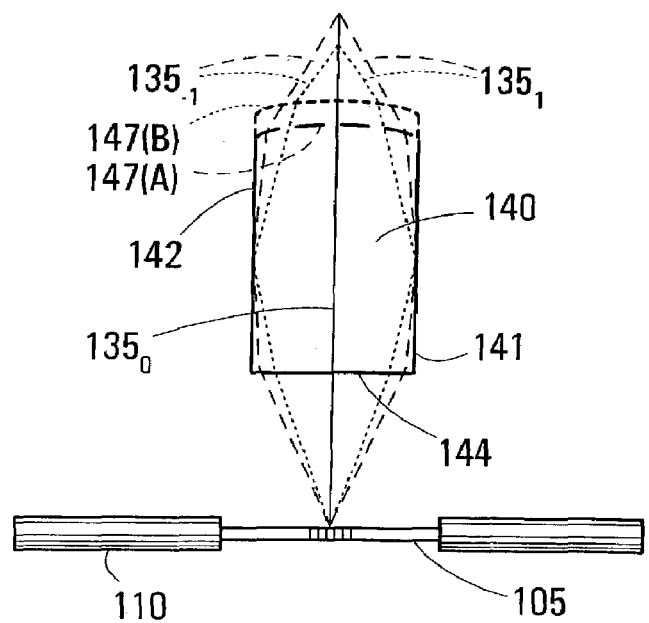
FIG. 3 shows a variant of the optical apparatus shown on FIG. 1 including a curved surface.

In a further variant, shown on FIG. 3, the transmissive block 140 includes a curved surface 197A instead of the front face 143 shown in FIG. 1, which was planar. Backward or forward shifting the curved surface 197A can be used to change the angle at which the sub-beams $135_{-1}$ and $135_1$ enter the transmissive block 140, which changes the angle at which the sub-beams $135_{-1}$ and $135_1$ leave the transmissive block 140, which changes the period of the Bragg grating produced at the location of intersection of the sub-beams $135_{-1}$ and $135_1$.

Specifically, changing the distance between the curved surface 197 and the diffractive element 130 (i.e., moving from A to B in FIG. 3) produces a variation in the location along the surface 197 at which the divergent sub-beams $135_{-1}$ and $135_1$ enter the transmissive block 140. Due to the surface 197 not being planar, the angle of incidence with which the sub-beams $135_{-1}$ and $135_1$ arrive at the curved surface 197 varies with the distance between the curved surface 197 and the diffractive element 130. This variation in the angle of incidence at which the sub-beams $135_{-1}$ and $135_1$ enter the transmissive block 140 produces a variation in the angle at which the two sub-beams $135_{-1}$ and $135_1$ are propagated in the transmissive block 140 further to being refracted at the surface 197.

This may lead to an intersection occurring at a different region in space for case A than case B. However, the distance between the back face 144 and the region of intersection can be controlled by appropriately selecting the distance between the diffractive element 130 and the curved surface 197. Specifically, by appropriately shifting the position of the diffractive element, the sub-beams $135_{-1}$ and $135_1$ exiting the transmissive block 140 can be made to intersect at the same region in space in both A and B. In this way, it is possible to change the period of the Bragg grating by merely changing the transmissive block 140 without having to change any other component in the apparatus 100.

It should be appreciated that in some embodiments, the transmissive block 140 may be composed of a basic block in the shape of a prism, to which it is possible to optically couple any of a set of curved attachment blocks, each having a curved face and a particular length. The curved face may have the same curvature profile or it may be different for different attachment blocks of different lengths. Also, it is within the scope of the present invention to provide attachment blocks of roughly the same length, with different curvature profiles in order to achieve different angles of intersection and hence different Bragg periodicity. Those skilled in the art will be capable of determining what shift, if any, is required in the position of the diffraction element 130 in order to maintain the distance between the transmissive block 140 and the region of intersection of the first order sub-beams.

Those skilled in the art will appreciate that the apparatus 100 would work in sensibly the same way if the inside walls of the transmissive block 140 are not parallel or if the curved surface 197 is located on the side of the transmissive block 140 through which the light exits the transmissive block 140.

While specific embodiments of the present invention have been described and illustrated, it will be apparent to those skilled in the art that numerous modifications and variations can be made without departing from the scope of the invention as defined in the appended claims.

What is claimed is:

1. Apparatus for producing an interference pattern from an input optical beam, comprising:
   a. a first optical element for separating the input optical beam into a plurality of divergent optical sub-beams;
   b. a second optical element including a first surface and a second surface;
   c. said first surface being optically coupled to said first optical element to receive at least two of the plurality of sub-beams;

d. said second optical element capable of redirecting via total internal reflection at least one of the sub-beams received at said first surface such that at least two sub-beams emerge from said second surface along respective paths intersecting one another outside said second optical element at a distance from said second surface.

2. Apparatus as defined in claim 1, wherein said first optical element includes a diffractive element.

3. Apparatus as defined in claim 2, wherein said diffractive element is a phase mask.

4. Apparatus as defined in claim 3, wherein said phase mask produces a sub-beam of order zero, a first sub-beam of order 1 that diverges by an angle θ from the sub-beam of order zero and a second sub-beam of order 1 that diverges by an angle–θ from the sub-beam of order zero, wherein θ is between about 7° and about 23°.

5. Apparatus as defined in claim 2, wherein said diffractive element is a beam splitter.

6. Apparatus as defined in claim 1, wherein the sub-beams emerging from said second surface include a sub-beam of a first order and a sub-beam of a second order different from the first order.

7. Apparatus as defined in claim 6, wherein the first order is zero and the second order is 1.

8. Apparatus as defined in claim 1, wherein the sub-beams emerging from said second surface include a first sub-beam of a first order and a second sub-beam of the first order.

9. Apparatus as defined in claim 8, wherein the first order is 1.

10. Apparatus as defined in claim 8, wherein the sub-beams emerging from the second surface further include a sub-beam of a second order different from the first order.

11. Apparatus as defined in claim 10, wherein the first order is 1 and the second order is zero.

12. Apparatus as defined in claim 10, wherein the first sub-beam of the first order diverges from the sub-beam of the second order by an angle θ with respect to the sub-beam of the second order and wherein the second sub-beam of the first order diverges from the sub-beam of the second order by an angle –θ from the sub-beam of the second order.

13. Apparatus as defined in claim 12, wherein θ is between about 7 degrees and about 23 degrees.

14. Apparatus as defined in claim 1, wherein an index of refraction within said second optical element is higher than an index of refraction outside said second optical element.

15. Apparatus as defined in claim 1, further comprising a focusing lens for adjusting an intensity of at least one of the sub-beams emerging from the second surface.

16. Apparatus as defined in claim 1, wherein the sub-beams emerging from the second surface include a sub-beam of order zero, said apparatus further comprising a focussing lens for adjusting an intensity of the sub-beam of order zero.

17. Apparatus as defined in claim 7, further comprising a focussing lens for adjusting an intensity of the sub-beam of the first order.

18. Apparatus as defined in claim 11, further comprising a focussing lens for adjusting an intensity of the sub-beam of the second order.

19. Apparatus as defined in claim 1, wherein said second optical element is made of a material that is transparent to ultraviolet light.

20. Apparatus as defined in claim 1, further comprising a laser source for producing the input optical beam.

21. Apparatus as defined in claim 20, wherein said laser source is capable of producing the input optical beam at a wavelength between about 193 nanometers and about 300 nanometers.

22. Apparatus as defined in claim 20, wherein said laser source is capable of producing the input optical beam at a wavelength between about 193 nanometers and about 260 nanometers.

23. Apparatus as defined in claim 20, further comprising a lens assembly adapted to condition the input optical beam.

24. Apparatus as defined in claim 23, wherein the lens assembly includes a collimator.

25. Apparatus as defined in claim 23, further comprising a minor disposed between said lens assembly and said first optical element, said minor being arranged to deflect the input optical beam into said first optical element.

26. Apparatus as defined in claim 25, wherein said minor is movable between a range of positions providing a variable angle of deflection between said lens assembly and said first optical element.

27. Apparatus as defined in claim 1, wherein said second optical element further includes at least one side surface capable of providing the total internal reflection.

28. Apparatus as defined in claim 1, wherein said second optical element further includes at least two side surfaces capable of providing the total internal reflection.

29. Apparatus as defined in claim 1, wherein said second optical element further includes two parallel side surfaces capable of providing the total internal reflection.

30. Apparatus as defined in claim 1, wherein the at least two sub-beams received at the first surface include a sub-beam of order zero end wherein said first surface of said second optical element is adapted to block the sub-beam of order zero.

31. Apparatus as defined in claim 30, wherein said first surface of said second optical element is at least partially coated with an opaque film.

32. Apparatus as defined in claim 1, wherein said first surface of said second optical element is planar.

33. Apparatus as defined in claim 1, wherein said first surface of said second optical element is curved.

34. Apparatus as defined in claim 1, wherein said second surface of said second optical element is curved.

35. Apparatus as defined in claim 1, wherein said first surface of said second optical element and said second surface of said second optical element are both curved.

36. Apparatus as defined in claim 1, wherein said second optical element is configured to cause the paths of the at least two sub-beams emerging from the second surface to intersect at a relative angle that is different from the relative angle at which the at least two sub-beams received at the first surface leave said first optical element.

37. Apparatus as defined in claim 1, wherein said second optical element is made substantially of quartz.

38. Apparatus as defined in claim 1, wherein said second optical element is in a solid state.

39. Apparatus as defined in claim 2, wherein said diffractive element is an apodized holographic phase mask.

40. Apparatus as defined in claim 1, further comprising a removable third optical element for placement between said first and second optical elements, said third optical element having a third surface facing said first optical element and a fourth surface facing said first surface of said second optical element, said third surface being curved.

41. Apparatus as defined in claim 1, wherein said second optical element is configured so as to not refract at least one of the at least two sub-beams received at said first surface.

42. Apparatus as defined in claim 41, wherein the at least one of the sub-beams not refracted by said second optical element is a sub-beam of order zero.

43. Apparatus as defined in claim 1, wherein said second optical element is configured to filter out at least one of the at least two sub-beams received at said first surface so that fewer sub-beams emerge from said second surface tan are received at said first surface.

44. Apparatus as defined in claim 1, wherein said second optical element is a cubic prism.

* * * * *